United States Patent [11] 3,542,324

| [72] | Inventor | Allan H. Willinger<br>New Rochelle, New York |
|---|---|---|
| [21] | Appl. No. | 688,748 |
| [22] | Filed | Dec. 7, 1967 |
| [45] | Patented | Nov. 24, 1970 |
| [73] | Assignee | Metaframe Corporation<br>Hawthorne, California<br>a corporation of Delaware. by mesne assignments |

[54] AQUARIUM HEATER-MOUNTING DEVICE
6 Claims, 5 Drawing Figs.

[52] U.S. Cl. .................................................. 248/360, 248/226
[51] Int. Cl. ..................................................... B25b 5/00
[50] Field of Search ...................................... 248/359, 360, 226.2, 226.5, 316.5, 226.1, 226

[56] References Cited
UNITED STATES PATENTS
1,309,965  7/1919  Schwab ........................ 248/226
1,862,729  6/1932  Watts ............................. 248/226
2,958,760  11/1960  McNally ........................ 248/226X
3,248,156  4/1966  Repko ............................ 211/49X
2,577,044  12/1951  Steinau ......................... 248/226.2X
3,182,943  5/1965  Crossman ..................... 248/226X FOREIGN PATENTS
466,084  9/1928  Germany ....................... 248/226

Primary Examiner—Chancellor E. Harris
Attorney—Friedman & Goodman

ABSTRACT: The invention is directed to novel means for springingly mounting an aquarium heater upon the rim of an aquarium tank by providing a mounting device on the heater, which device comprises a resilient member acting in association with a stationary member upon the rim of the tank interposed therebetween, with the result that the heater is springingly engaged with the rim of the tank.

Patented Nov. 24, 1970

3,542,324

INVENTOR.
ALLAN H. WILLINGER
BY
Friedman & Goodman
ATTORNEYS

Patented Nov. 24, 1970

3,542,324

INVENTOR.
ALLAN H. WILLINGER
BY
Friedman & Goodman
ATTORNEYS

AQUARIUM HEATER-MOUNTING DEVICE

BACKGROUND OF THE INVENTION

1. Field of the Invention

This invention relates generally to an aquarium heater and more particularly to novel means for mounting the same upon an aquarium tank.

2. Description of the Prior Art

Heating devices for raising the temperature of aquaria to desired levels most suitable for the maintenance and propagation of the fish contained therein are known and widely employed by aquarium hobbyists. One such heater is described in my U.S. Pat. No. 3,107,290. Therein is disclosed an aquarium heater comprising an elongated heat-resistant tube which is suspended from a housing comprising upper and lower cases, and is provided with a temperature control knob in the upper case. The lower portion of the heat-resistant tube contains the heating element and is immersed below the water level of the tank when in use. Suitable electrical leads project from the housing to a source of electric power. The aquarium heater is mounted upon the rim of an aquarium tank by means of the engagement of a clamping screw with the peripheral edge of the tank which is disposed between the end of the clamping screw and a pair of downwardly projecting bosses, each of which is disposed forwardly of the clamping screw and laterally of the axis thereof.

However, it is a disadvantage of these prior art heaters that when the clamping screw is tightened, it dents the stainless steel frame of the tank, or if tightened against the glass wall of the tank itself it can crack or scratch the glass. Another disadvantage is that excessive tightening of the clamping screw tends to snap it off or to deform the screw retainer. Excessive tightening is difficult to avoid since it is human nature to turn a clamping screw, or the like, until it can go no further, since obviously this is the only way to insure a "tight fit". Another problem that arises from excessive tightening is that leverage is thereby applied to the glass heat-resistant tube at its lowest point, thereby tending to shatter it. The prior art mounts are also inconvenient in that the clamping screws project outwardly from the mount causing the aquarium tank to be disposed at a distance from the wall at which it is intended to display the tank.

SUMMARY OF THE INVENTION

It is therefore among one of the principal objectives of this invention to overcome the aforementioned prior art difficulties.

In accordance with the present invention there has been discovered novel means for springingly, yet securely, mounting an aquarium heater upon the rim of an aquarium tank by providing a mounting device for said heater which comprises a resilient member acting in association with a stationary member upon said rim of said tank interposed therebetween with the result that said heater is springingly and tightly engaged with said rim of said tank.

BRIEF DESCRIPTION OF THE DRAWING

The invention will hereinafter be more fully described with reference to the accompanying drawing in which.

DESCRIPTION OF THE PREFERRED EMBODIMENTS

Figure 1:
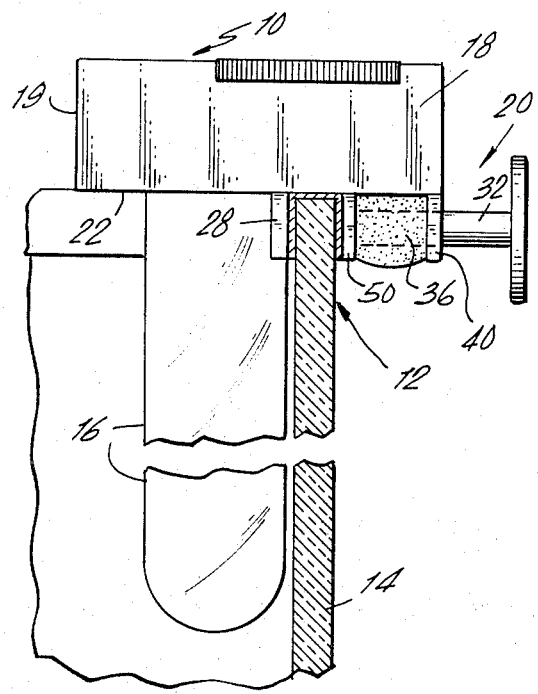
FIG. 1 is a view showing the invention mounting device, in one specific embodiment, as engaged with a rim of an aquarium tank (shown fragmented).
Figure 2:
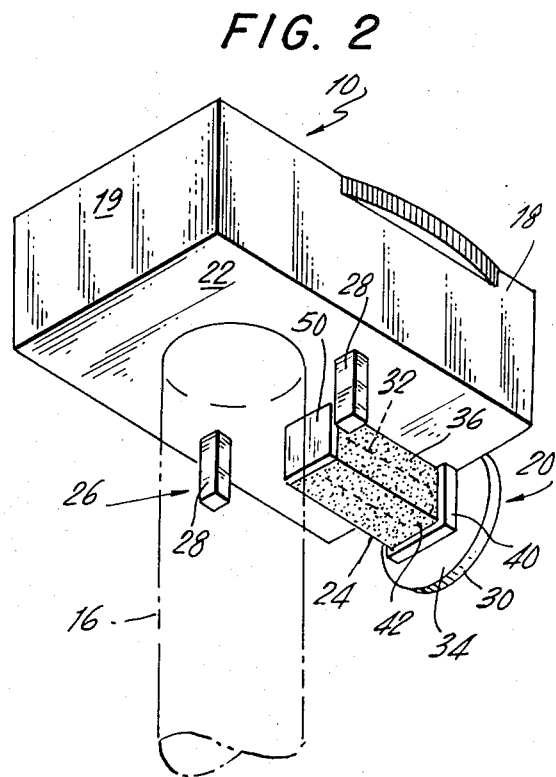
FIG. 2 is a view in perspective of the invention device illustrated in FIG. 1.

Referring now to the FIGS. of the drawing, wherein like parts will be identified by like reference numerals, for purposes of illustration, FIG. 1 depicts an aquarium heater 10 as mounted on the rim 12 of an aquarium tank 14, according to the manner of the invention. As will be seen by referring to FIG. 2, the aquarium heater 10, itself more fully described, for example, in said U.S. Pat. No. 3,170,290, comprises an elongated heat-resistant tube 16 which may be of glass (partially shown by phantom lines) which is suspended from a housing 18. The lower portion of said tube contains a heating cartridge (not shown) and is immersed below the water level of the tank when in use; suitable electric leads (also not shown) project from said housing for connection to a source of electric power. These features are known and need not more fully be described. The aquarium heater 10 is mounted upon the said rim of said tank by means of a resilient or springing engagement. This is accomplished by means of the invention mounting device 20 which is provided on the lower horizontal surface 22 of housing 18. The mounting device 20 comprises a resilient member 24 and a stationary member 26. Member 26 further comprises a pair of downwardly projecting bosses 28, each of which is disposed forwardly of member 24 and laterally of the axis thereof. Member 24 further comprises a disc 30 having a perpendicularly inwardly directed rod 32 integrally joined thereto at a generally central location on a face 34 of said disc, said rod 32 being inwardly directed with respect to said member 26. A spring device is provided around said rod 32 by means of a mass of urethane foam 36 whose action will be described presently. Member 24 is secured to housing 18 at surface 22 by means of a mounting support 40 which projects downwardly from surface 22, mounting support 40, being generally square in shape, it may also be rectangular, and having a bore 42 therethrough which allows for passage of rod 32 therethrough. It will be noted that disc 30 is just outside of housing 18 and its face 34 rests partially on an end wall 19 thereof. The square end face 50 of rod 32 (integral therewith) is narrower than the distance between bosses 28, and is disposed in a generally central location between bosses 28 and extends at least partially laterally therebetween. Thus when the heater 10 is to be mounted on the rim of an aquarium tank, what is done is to pull back manually on the disc 30, outwardly, thereby creating a spring tension by means of the resilient urethane foam packed around the rod 32, the bosses are placed inside the rim in flat abutting relation therewith, and then the disc is released and the rim is springingly engaged by means of the resilient member 24 acting in association with the stationary member 26 thereupon, said rim being now between the resilient member 24 and stationary member 26. As illustrated, the urethane foam is generally square in cross section, but this is not critical and it is to be understood that it may be rectangular, or round as well.

Figure 3:
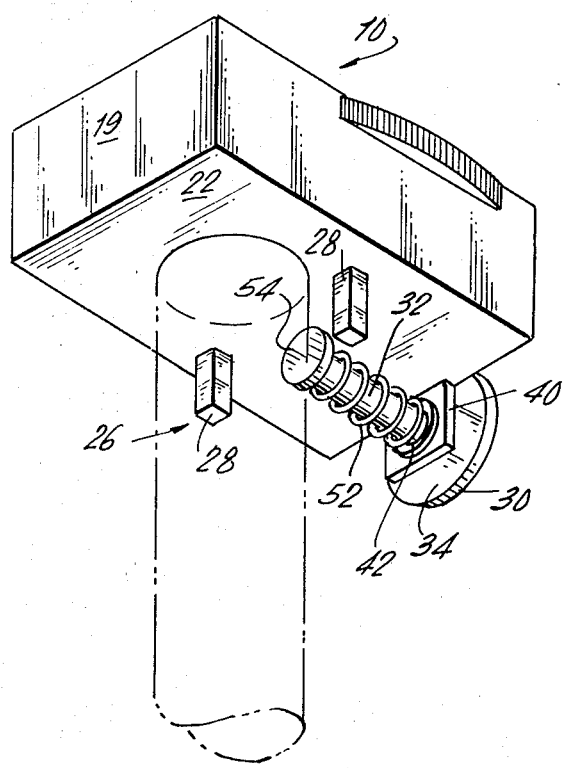
FIG. 3 is a view in perspective of another specific embodiment of the invention.

Turning now to FIG. 3, the same principle is employed in a different embodiment of the mounting device of the invention. Similar to FIG. 2 there are shown bosses 28, disc 30, rod 32 and mounting support 40, etc., however, instead of urethane foam there is now provided a metal spring coil 52 (it could also be plastic), spring 52 being disposed around rod 32 between support 40 and rod end 54. Rod end 54 is of larger diameter than the rod so that the spring coil 52 will not slide thereoff. Now when disc 30 is drawn outwardly, the spring is compressed creating a spring tension and as before a tank rim placed between the rod end 54 and bosses 28 will be securely, springingly held.

Figure 4:
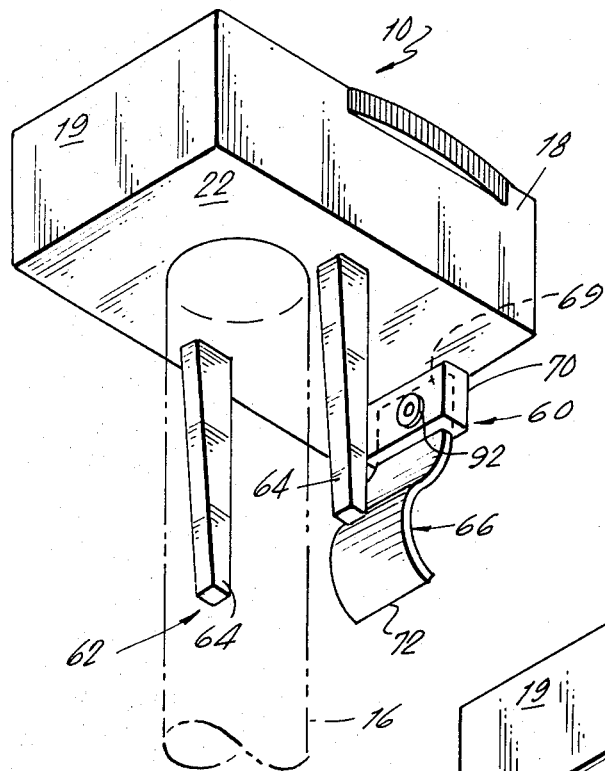
FIG. 4 is a view in perspective of yet another embodiment of the invention.

Referring now to FIG. 4, in still another embodiment of the invention, there is provided a heater 10 with a mounting device 60. Mounting device 60 comprises a stationary member 62 which further comprises a pair of downwardly projecting bosses 64. (It is to be noted at this point that bosses 28 and 64 may be of varying lengths and the lengths thereof will depend upon the length of the resilient member with which they act in association). Mounting device 60 also comprises a resilient member 66 which in turn further comprises an S-shaped leaf spring 68 which is rivetally mounted at its one end 69 inside mounting support 70. Spring 68 is centrally disposed between bosses 64 (being narrower than the distance between them) and the curved portion of the "S" projects at least partially laterally between them, so that when the rim of an aquarium tank is disposed between the bosses 64 and spring 68, as heretofore described, the rim is springingly held therebetween. The mounting device 60 may be forced down over the rim by exerting a slight downward pressure, or spring 68 may be manually drawn outwardly by its bottom end 72, thereby allowing the rim to slip between the spring 68 and the bosses 64, and thence releasing the spring onto the rim. Support 70, as shown, is generally rectangular in shape, but it is to be understood that this is not critical and it may also be square in shape.

Figure 5:
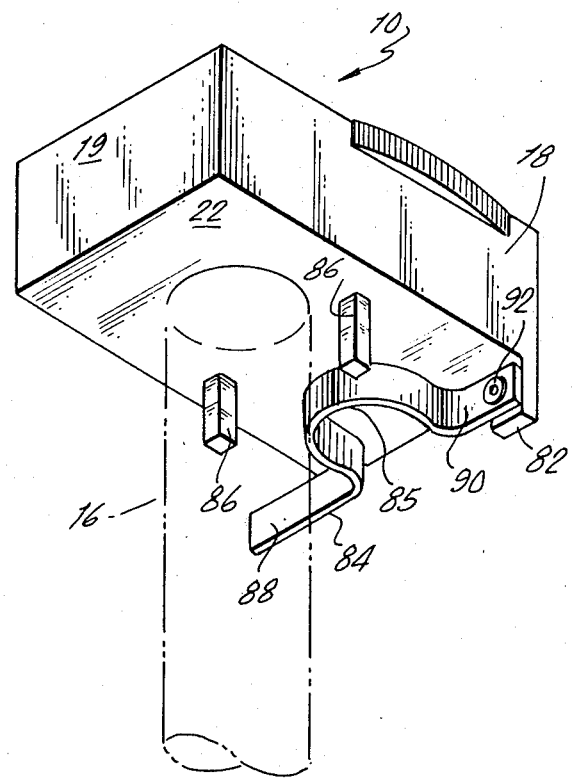
FIG. 5 is a view in perspective of still another embodiment of the invention.

Referring to FIG. 5, there is illustrated yet another embodiment of the invention. Therein is provided a heater 10 with a mounting device 80. Whereas in previous embodiments, the mounting supports 40 and 70 were in a generally central disposition on the lower surface 22, now there is provided a mounting support 82 which projects downwardly from a corner of lower surface 22. Thereon is rivetally attached a spring clip 84 which acts in association with downwardly projecting bosses 86. Spring clip 84 has a central U-shaped portion whose curved portion 85 extends inwardly, that is towards bosses 86; the legs of the "U" flare, at their upper ends, integrally and substantially perpendicularly to the legs, so that a pair of horizontal arms 88 and 90 are resultingly formed. Arm 90 is attached to mounting support 82 by means of a rivet 92. Putting it yet another way, spring clip 84 is shaped like a mantelpiece clock with one end of the base portion riveted to the mounting support 82, and the curved portion of the clock directed towards the bosses 86. When it is desired to springingly mount the heater onto a tank rim, what is done is to pull back the spring clip 84 (outwardly away from the bosses 86) by means of arm 88, the bosses are disposed inside the rim in flat, abutting relation therewith, and the arm 88 is released, thereby springingly securing the rim. As before the U-portion of the clip 84 extends between and at least partially through the bosses 86 so that a tight, springing relation may be achieved with the tank rim.

It is to be understood that the various parts of the mounting device of the invention may be either plastic or metal, except where otherwise specified, and preferably plastic. Where the housing 18, bosses and mounting supports of the invention device are plastic, then it is to be understood that preferably the bosses and mounting supports are integrally joined to the housing. From the foregoing, it is apparent that the manufacturer can determine beforehand, exactly how tightly he wants the heater unit to be secured to the aquarium rim, thus eliminating the prior art problems heretofore mentioned. It is also apparent that the mounting device eliminates any protrusion to the display wall.

Having thus described the fundamental novel features of the invention as applied to a specific embodiment, it is to be understood that various changes may be made by those skilled in the art without departing from the spirit and scope thereof.

I claim:

1. In combination with an aquarium-heating device provided with a vertically disposed heating element, a fastening device attached thereto for fastening said heater to an aquarium which comprises at least one stationary boss located proximate said heating unit between said heating element and a yielding clamping member positioned on said heating device on its side and extending inward toward said boss, said member being springly yieldable so as to be contractable away from said boss a distance to allow the insertion of an aquarium wall between said boss and said member, and said member being adaptable to engage said wall and to exert pressure thereagainst.

2. An improvement in an aquarium device according to claim 1, wherein said member is a rod engaged with a coil spring, said rod having a disc at its extremity proximate said boss.

3. An improvement according to claim 1, wherein said member comprises a spring leaf of generally S-shape mounted on said heater, wherein there are a plurality of bosses, said spring leaf and said bosses mounted on an undersurface of the housing of said heater, said bosses projecting downwardly from said undersurface, said spring leaf being mounted by one end of said S-shape, the remaining curved portion of said spring leaf extending toward said bosses.

4. An improvement according to claim 1, wherein said member comprises a spring clip having a generally U-shaped center portion, the terminal ends of the legs of said "U" flaring integrally, substantially perpendicularly outwardly to form a pair of arms, one of said arms being mounted to the undersurface of the housing of said heater, a pair of bosses, said bosses projecting downwardly from said undersurface, said U-shaped center portion being directed towards the space between said bosses.

5. An improvement according to claim 1, wherein said member is polyurethane under stress which is wrapped about an inwardly extending rod member having a disc at its end proximate said boss.

6. An improvement in an aquarium-heating device according to claim 1, wherein there are a plurality of bosses disposed in laterally spaced relationship, and said yielding member being substantially centrally disposed with respect to the outermost ones of said laterally spaced bosses and extending laterally therebetween.